Kenneth W. Zunk
INVENTOR.

Oct. 16, 1956 K. W. ZUNK 2,766,672
TILLING TOOL
Filed Oct. 2, 1953 2 Sheets-Sheet 2
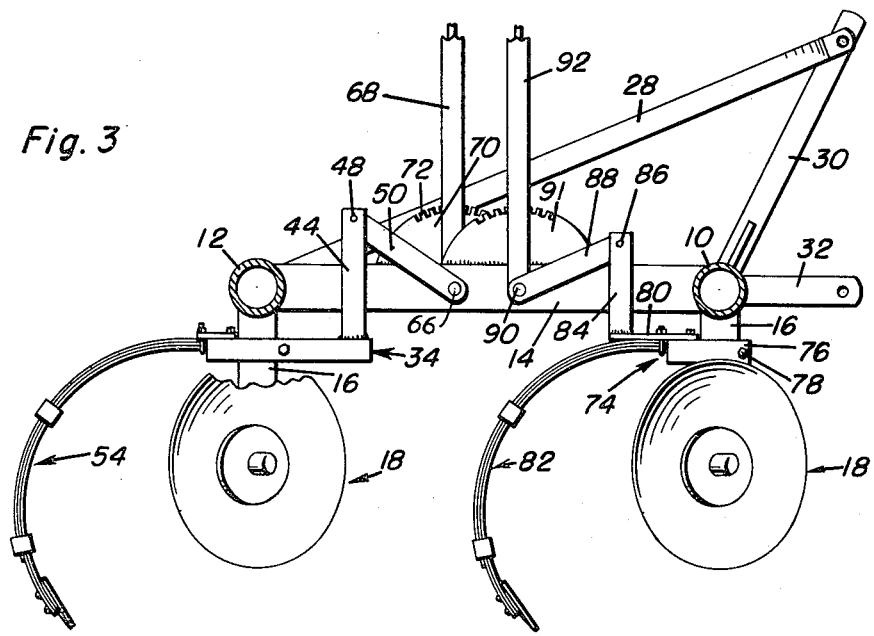
Fig. 3
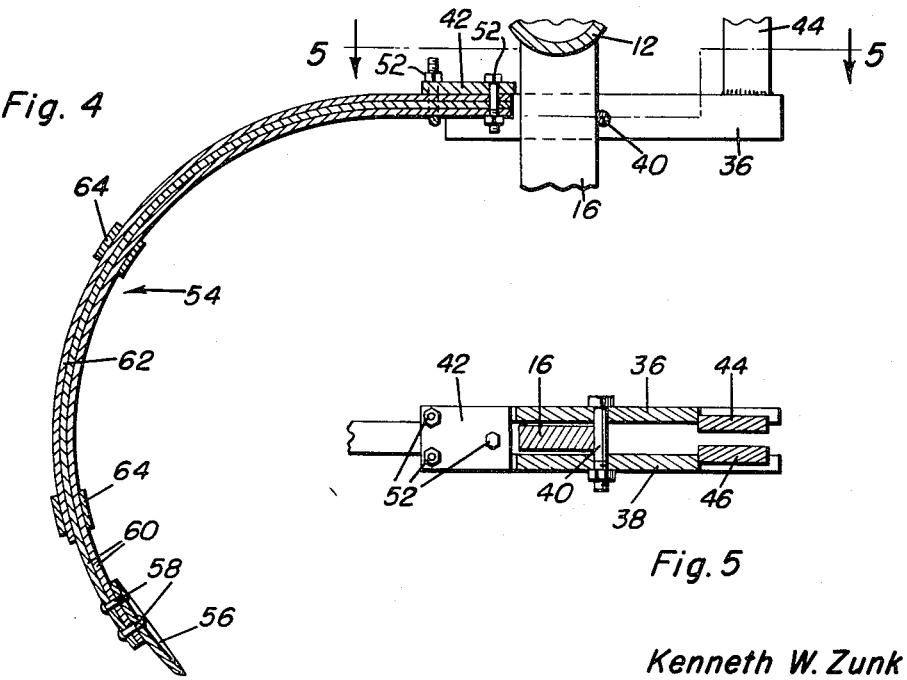
Fig. 4
Fig. 5
Kenneth W. Zunk
INVENTOR.

United States Patent Office 2,766,672
Patented Oct. 16, 1956

2,766,672
TILLING TOOL
Kenneth W. Zunk, Martin, Ohio
Application October 2, 1953, Serial No. 383,721
2 Claims. (Cl. 97—8)

This invention relates generally to agricultural machinery and pertains more particularly to an improved form of deep tillage tool.

A primary object of this invention is to provide an improved form of tillage tool which includes vertically adjustable spring teeth mounted behind rotatable disks which prepare the top soil by cutting trash and vegetation ahead of the spring teeth so that the latter may efficiently perform their function of deep tillage without becoming clogged.

Another object of this invention is to provide an improved deep tillage tool in conformity with the foregoing object which is constructed in a simple yet efficient manner and which lends itself readily to mass production.

Still another object of this invention is to provide an improved tillage tool which will simultaneously cut trash and vegetation on the top surface of the soil and work the same into the top soil while at the same time performing deep tillage action at any desired depth to provide better drainage for the land being worked.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical section taken substantially along the plane of section line 3—3 of Figure 1 showing details of the spring tooth mounting;

Figure 4 is an enlarged section taken through one of the spring tooth members and its associated supporting mechanism; and Figure 5 is a horizontal section taken substantially along the plane of section line 5—5 of Figure 4.

Figure 1:
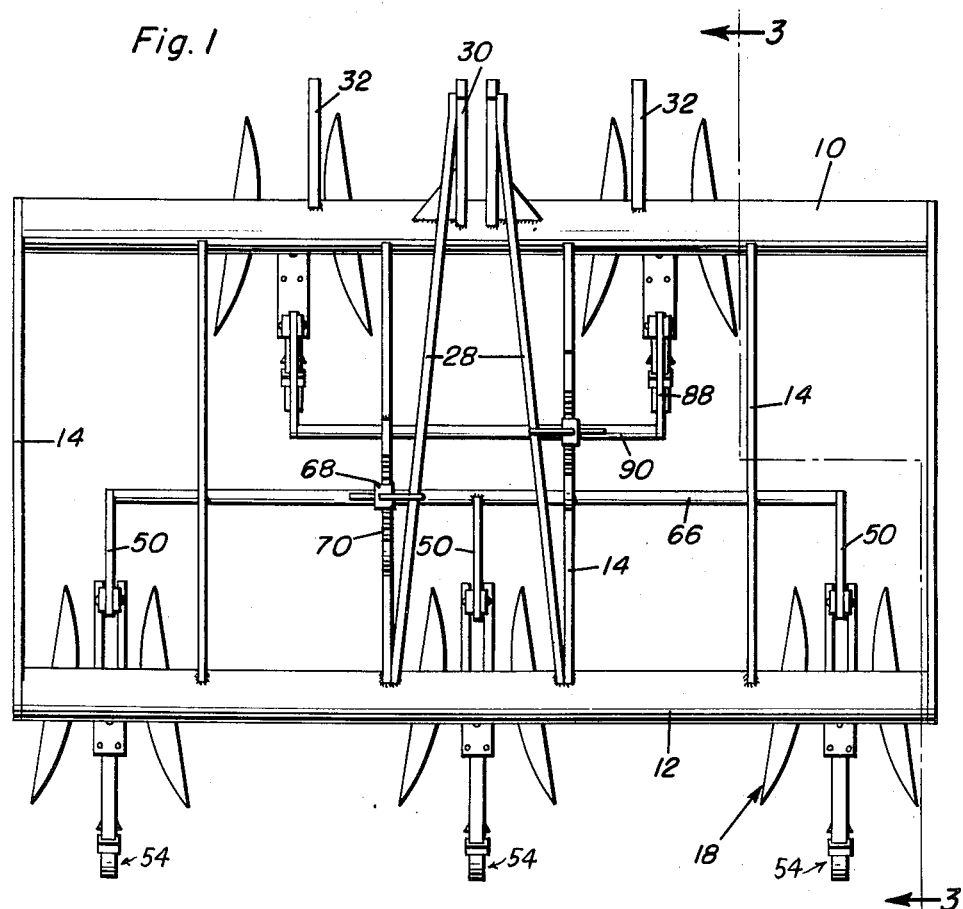
Figure 1 is a top plan view of the tilling tool.

Referring now more particularly to the drawings, the tilling tool includes a front tubular frame member 10, a rear tubular frame member 12 and various longitudinal frame members 14 interconnecting the front and rear frame members. As seen most clearly in Figures 3 and 4, each of the frame members 10 and 12 is provided with a plurality of depending bars or straps 16 for the purpose of mounting the disk assemblies 18.

Figure 2:
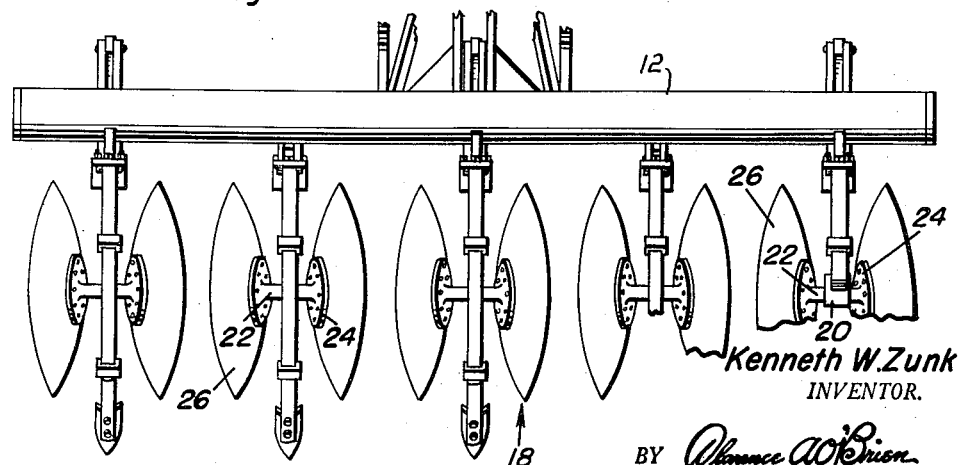
Figure 2 is a rear elevational view of the assembly shown in Figure 1.

Referring now more particularly to Figure 2, it will be seen that each of these bars 16 terminates at its lower end in a boss 20 which provides a bearing for the axle 22 provided at opposite ends with flange portions 24 which are rigidly secured to the disk members 26. In this manner, it will be understood that the disk members 26 provide a support for the frame assembly as the same is moved along over the ground surface behind a towing vehicle (not shown). In this respect, it will be noted that a pair of forwardly extending converging draft members 28 are secured at one end to the rear frame member 12 and that a pair of upwardly inclined draft members 30 are secured at their lower ends to the front frame member 10. These various draft members 28 and 30 may be suitably secured together at their upper ends with the members 30 being spaced apart to receive therebetween the upper idler link of a tractor hydraulic lift system, while the tongues 32 extend forwardly from the frame member 10 for connection to the lower lift arms of a powered tractor.

Bracket assemblies indicated generally by the reference character 34 are provided in conjunction with each of the straps 16 on the rear frame member 12, these bracket assemblies include a pair of horizontal plate members 36 and 38 which are disposed on opposite sides of the members 16 in the manner shown most clearly in Figure 5. A bolt 40 extends between these plate members forwardly of the straps 16 and a support plate 42 is rigidly secured between these plate members rearwardly of the support members 16, so that the bracket assemblies 34 are slidably carried by the support members 16. The bracket assemblies also include the upright leg portions 44 and 46 secured rigidly at their lower ends to the plate members 36 and 38, respectively, and being apertured at their upper ends to receive the pivot bolt or pin 48 for connection to one end of an adjusting arm 50.

The plates 42 are suitably apertured to receive a number of fastening members 52 which extend therethrough for rigidly securing the spring tooth members 54 in depending relation to the plate in the manner shown. Members 54 may be provided at their lower ends with shoes 56 suitably secured as by rivets 58 to the main spring elements 60 which depend in arcuate fashion from the plate 42 and which may be reinforced by the backing spring member 62, all the spring elements being secured together as by the clip member 64.

An adjusting rod 66 extends through suitable journal apertures in the intermediate of the longitudinal frame members 14, and this bar forms a base for connection of the various adjusting arms 50, as will be seen most clearly in Figures 1 and 3. An adjusting lever 68 is secured adjacent one end of bar 66 and cooperates with a suitable sector member 70 secured to the upper surface of one of the frame members 14 to hold the bar 66 in various adjusted rotated positions, any suitable latching mechanism being provided for this purpose for cooperation with the teeth 72 on the sector 70.

Bracket assemblies 74 are utilized in conjunction with the strap members 16 on the forward frame member 10 are similar in construction to the previously described bracket members inasmuch as they include spaced horizontal plate members 76 straddling the straps 16 and provided with the guide bolts 78 forwardly of the members 16 and with plate members 80 rearwardly of these members, the plates 80 forming a support for the spring tooth elements 82 depending therefrom. Upright leg members 84 are secured at their lower ends to the upper surface of the plate 80, and are apertured to receive the pivot pins 86 at their upper ends for pivotal connection to adjusting arms 88 carried by the transverse bar 90 which is journaled in the innermost frame members 14 in a manner similar to the bar 66. A sector 91 and lever 92 are associated with the bar 90 for adjusting the same into the desired position.

In operation, it will be manifest that the disk assemblies 18 support the frame for travel over the ground surface, and that these disk members are preferably disposed in angular relation as shown for most effectively cutting or breaking up the top soil, including any trash or vegetation thereon. A spring tooth is associated with each pair of disks and is disposed rearwardly thereof midway between the disks so that these teeth will not become clogged during operation, any foreign material being effectively broken up or cut by the disks. The various bracket assemblies 34 and 74 are held in any desired vertical adjusted position with respect to the strap members 16 by virtue of the manipulation of the lever members 68 and 92 so that any desired depth of deep tillage by the spring tooth members may be obtained. In this manner, the disks not only perform the function of preparing the top soil and thoroughly mixing the vegetation into the same, but they protect the spring tooth elements against clogging, allowing these elements to be adjusted to a depth beneath the soil level to such an extent as to engage the hard pan beneath the top soil so as to provide better drainage and cultivation of the soil. The various disk and spring tooth assemblies are so disposed with respect to each other on the frame assembly such that effective tilling of the soil is accomplished throughout the width of the frame, that is, the various assemblies are disposed in staggered relation.

From the foregoing, the construction and operation of the device will be readily understood, and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tilling tool comprising a frame, a plurality of support members depending from said frame, disking assemblies comprising a pair of spaced vertical disk members connected by a transverse support axle journaled on a horizontal axis of rotation on lower end portions of the support members, bracket assemblies carried on the frame in reciprocable vertically adjustable engagement with said support members, said bracket assemblies including a portion circumposed about an intermediate portion of the support members, tooth elements carried in depending relationship on the bracket assemblies, said tooth elements including soil-engaging shoe portions extending rearwardly in underlying relationship between the disk members of each disking assembly, and vertical adjusting means carried on said frame in engagement with an upper end portion of the bracket assemblies for vertically adjusting the shoe portions relative to the disk members.

2. The combination as set forth in claim 1 wherein said vertical adjusting means includes a horizontally disposed bar rotatably supported on said frame, vertically pivotal levers secured at one end on intermediate spaced portions of said bar, the levers having the outer end pivotally connected to the upper end portions of said bracket assembly, and adjusting lever and latch means carried on said frame in engagement with said horizontal bar.

References Cited in the file of this patent
UNITED STATES PATENTS

| | | |
|---|---|---|
| 545,170 | Poole | Aug. 27, 1895 |
| 576,877 | Miller | Feb. 9, 1897 |
| 1,059,936 | Hamilton | Apr. 22, 1913 |
| 1,328,638 | Ogden | Jan. 20, 1920 |
| 1,551,477 | Fleming | Aug. 25, 1925 |
| 1,642,277 | Turner | Sept. 13, 1927 |
| 1,807,827 | Brown | June 2, 1931 |
| 2,355,519 | Dunham | Aug. 8, 1944 |